(12) United States Patent
Sun et al.

(10) Patent No.: US 10,598,567 B1
(45) Date of Patent: Mar. 24, 2020

(54) MULTI-BOLT LOOSENING TEST MACHINE FOR FLANGE WITH TENSION, BENDING AND TORSION COMPOUND LOADING

(71) Applicant: DALIAN UNIVERSITY OF TECHNOLOGY, Dalian, Liaoning Province (CN)

(72) Inventors: Qingchao Sun, Dalian (CN); Bao Zhang, Dalian (CN); Qingyuan Lin, Dalian (CN); Wei Sun, Dalian (CN); Bin Yang, Dalian (CN)

(73) Assignee: DALIAN UNIVERSITY OF TECHNOLOGY, Dalian, Liaoning (CN)

( * ) Notice: Subject to any disclaimer, the term of this patent is extended or adjusted under 35 U.S.C. 154(b) by 0 days.

(21) Appl. No.: 16/613,759

(22) PCT Filed: Mar. 15, 2018

(86) PCT No.: PCT/CN2018/079092
§ 371 (c)(1),
(2) Date: Nov. 14, 2019

(87) PCT Pub. No.: WO2019/173995
PCT Pub. Date: Sep. 19, 2019

(51) Int. Cl.
*G01L 5/00* (2006.01)
*G01M 13/02* (2019.01)

(52) U.S. Cl.
CPC ............. *G01M 13/02* (2013.01); *G01L 5/00* (2013.01)

(58) Field of Classification Search
CPC .................................. G01M 13/02; G01L 5/00
See application file for complete search history.

(56) References Cited

U.S. PATENT DOCUMENTS

| 2,286,642 A | * | 6/1942 | Pendleton | G01N 3/06 73/806 |
| 3,440,869 A | * | 4/1969 | Hardiman | G01L 5/0042 73/761 |
| 3,643,501 A | * | 2/1972 | Pauley | B25B 23/147 73/862.24 |

(Continued)

FOREIGN PATENT DOCUMENTS

| CN | 103512745 A | 1/2014 |
| CN | 104655379 A | 5/2015 |

(Continued)

*Primary Examiner* — Freddie Kirkland, III
(74) *Attorney, Agent, or Firm* — Muncy, Geissler, Olds & Lowe, PC

(57) ABSTRACT

The present invention provides a multi-bolt loosening test machine for flange with tension, bending and torsion compound loading. The multi-bolt loosening test machine for flange with tension, bending and torsion compound loading uses a transverse load generated by a three-phase asynchronous motor as a bending load applied to a flange, uses a tension force generated by a hydraulic puller as an axial tension load, and uses a torque generated by a servo motor as a torque load applied to the flange. The test machine is different from the current device that can apply two compound loads to a single bolt, and can apply three compound loads to the multi-bolt connection flanges. The present invention can isolate three compound loads from each other without interference, and display the applied loads in real time.

2 Claims, 1 Drawing Sheet

(56) References Cited

U.S. PATENT DOCUMENTS

| | | | | | |
|---|---|---|---|---|---|
| 3,866,463 | A | * | 2/1975 | Smith | B67B 3/261 |
| | | | | | 73/794 |
| 5,597,964 | A | * | 1/1997 | Binns | G01L 5/0042 |
| | | | | | 73/761 |
| 6,332,378 | B1 | * | 12/2001 | Loffler | B25B 23/14 |
| | | | | | 81/429 |
| 6,892,585 | B2 | * | 5/2005 | Clarke | F16B 31/025 |
| | | | | | 411/14 |
| 9,702,797 | B2 | * | 7/2017 | Yang | G01N 3/22 |
| 10,012,576 | B2 | * | 7/2018 | Zhao | G01N 3/08 |
| 2016/0216182 | A1 | * | 7/2016 | Zhao | G01N 3/08 |
| 2019/0242779 | A1 | * | 8/2019 | Sun | G01M 5/005 |
| 2020/0018673 | A1 | * | 1/2020 | Sun | G05B 19/0405 |

FOREIGN PATENT DOCUMENTS

| | | | |
|---|---|---|---|
| CN | 105784304 | A | 7/2016 |
| CN | 106769038 | A | 5/2017 |
| CN | 107271166 | A | 10/2017 |
| CN | 107505124 | A | 12/2017 |
| CN | 107621361 | A | 1/2018 |
| CN | 108444686 | A | 8/2018 |
| DE | 4311956 | A1 | 10/1994 |
| JP | 2009-133822 | A | 6/2009 |
| JP | 2011-047687 | A | 3/2011 |
| JP | 2014-228465 | A | 12/2014 |
| KR | 10-2016-0064636 | A | 6/2016 |
| KR | 10-2017-0105294 | A | 9/2017 |
| SU | 1200148 | A1 | 12/1985 |

* cited by examiner

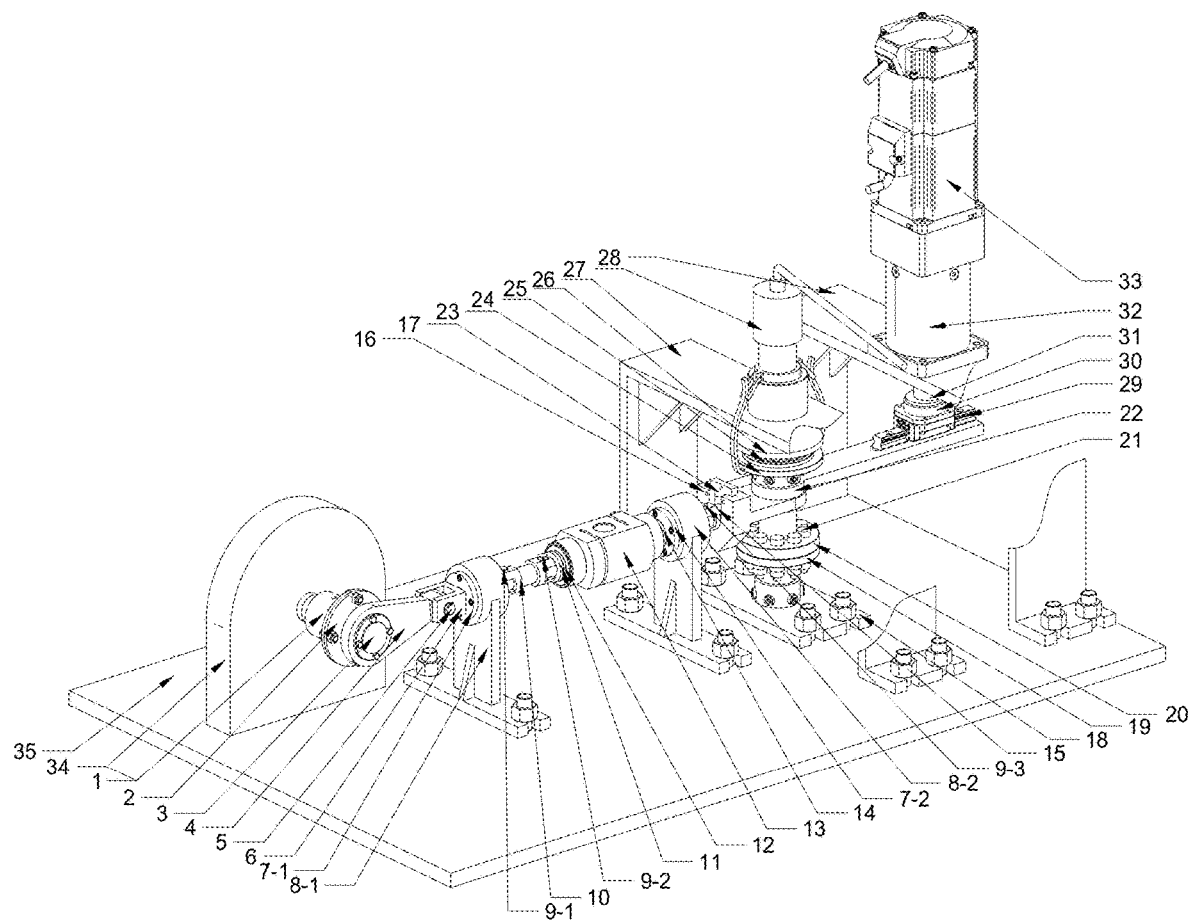

MULTI-BOLT LOOSENING TEST MACHINE FOR FLANGE WITH TENSION, BENDING AND TORSION COMPOUND LOADING

CROSS REFERENCE TO RELATED APPLICATION

This application is a U.S. National Stage Application under 35 U.S.C. § 371 of PCT Application No. PCT/CN2018/079092, filed Mar. 15, 2018, whose entire disclosure is hereby incorporated by reference.

TECHNICAL FIELD

The present invention belongs to the technical field of mechanical testing devices, and relates to a multi-bolt loosening test machine for flange with tension, bending and torsion compound loading.

BACKGROUND

A bolt loosening test machine can be used to research looseness under the condition that a bolt bears the load, and the current bolt loading loosening test machines are classified into the following categories:

1、 Junker Type Looseness Test Method

For example, GB/T 10431-2008. A Junker type looseness testing machine primarily applies an alternating transverse load to a fastener that applies a pretightening force to enable the fastener to move transversely. This transverse motion causes relative swing between a bolt and a nut, thereby resulting in greater micro slip of contact surface between threads and rapid looseness of the fastener. This allows the fastener to loosen faster than any previous test method.

2、 Electro-Hydraulic Servo-Controlled Vibration Method

During test, a tested fastener is tightened on a clamping platform, and a specified pretightening force is produced. An alternating transverse displacement is produced between two clamped metal plates through a servo hydraulic cylinder, resulting in reduction or even loss of a clamping force. The instantaneous clamping forces are continuously recorded, and the anti-looseness properties of the fastener are judged by comparison.

3、 NAS Vibration Test Method

A specimen is tightened into a test sleeve, and location marks are made on a part and the sleeve. Then, the sleeve is placed on a vibration testbed for moving back and forth. After starting, the sleeve impacts both ends of a guide back and forth in the guide, producing a large impact force and causing looseness of the specimen. During the test, the position change of the specimen is recorded with regular stop, and the anti-looseness properties of the specimen are judged accordingly.

All of the above test stations are intended for a single bolt loosening testbed, and bear single load. However, in the analysis of multi-bolt structures such as flanges, the load on the bolt cannot be simply and accurately equivalent to the single bolt due to the existence of the interaction between the bolts; and in the process of actual use of the bolts, in the case of a plurality of bolts, the load is generally complicated, and is not a single transverse load. Therefore, this testbed is designed to effectively simulate the actual load condition of the multi-bolt flange and to obtain the looseness of each bolt more appropriately when a plurality of bolts bear the load. At present, there is no relevant patent in the multi-bolt loosening test machine.

SUMMARY

The purpose of the present invention is to provide a multi-bolt loosening test machine for flange with tension, bending and torsion compound loading, which is a test machine researching the anti-looseness properties of bolts by applying tension, bending and torsion compound loading to multi-bolt connection flanges.

The technical solution of the present invention is:

A multi-bolt loosening test machine for flange with tension, bending and torsion compound loading consists of three parts: an axial load transmission part, a transverse load transmission part and a torque load transmission part.

The axial load transmission part comprises a bottom clamping plate 18, a thin specimen 19, a thick specimen 20, a specimen bolt 21, a bearing cap 23, a thrust ball bearing 24, a top clamping plate 25, an axial load bracket 26 and a hydraulic puller 27; the bottom clamping plate 18 and the axial load bracket 26 are fixed to a base 35; seam allowances of the thin specimen 19 and the thick specimen 20 are correspondingly assembled together, and assembled and fixed in corresponding bolt holes through the specimen bolt 21; the thin specimen 19 and the thick specimen 20 are integrally installed between the bottom clamping plate 18 and the top clamping plate 25; an outer hexagonal head of the thin specimen 19 is installed in an inner hexagonal head of the bottom clamping plate 18 and is fixed with an inner hexagonal head bolt; the end of the thick specimen 20 is installed in an inner ring of the top clamping plate 25 and is fixed with an inner hexagonal head bolt; the bearing cap 23 penetrates through the top clamping plate 25, and clamps the thrust ball bearing 24 between the bearing cap 23 and the top clamping plate 25; and one end of a hydraulic pushing pole of the hydraulic puller 27 is placed in a cylinder on the axial load bracket 26, and a hook on the hydraulic pushing pole grapples the edge of the bearing cap 23.

The transverse load transmission part comprises an eccentric coupling 1, a camshaft 2, an end cap 3, a cam connecting rod 4, a hinge pin 5, a U-type connecting rod 6, a first linear bearing 7-1, a second linear bearing 7-2, a first support plate 8-1, a second support plate 8-2, a first Φ8.5 pin 9-1, a second Φ8.5 pin 9-2, a third Φ8.5 pin 9-3, an elastic rod 10, a short threaded part 11, an adjusting ring 12, an S-type column tension sensor 13, a long threaded part 14, a rotatable head 15, a tension plate 16, a limit plate 17 and a three-phase asynchronous motor 34; the first support plate 8-1, the second support plate 8-2 and the three-phase asynchronous motor 34 are fixed to the base 35; one end of the eccentric coupling 1 is fixed to a motor shaft of the three-phase asynchronous motor 34, and the other end is fixed together with the camshaft 2; the camshaft 2 is connected together with the cam connecting rod 4 through a ball bearing, and is sealed with the end cap 3 for dust prevention; the cam connecting rod 4 is connected with the U-type connecting rod 6 through the hinge pin 5; the first linear bearing 7-1 is fixed into the first support plate 8-1, and the U-type connecting rod 6 penetrates through the first linear bearing 7-1; one end of the elastic rod 10 is in hinge joint with the U-type connecting rod 6 through the first Φ8.5 pin 9-1, and the other end is in hinge joint with one end of the short threaded part 11 through the second Φ8.5 pin 9-2; the other end of the short threaded part 11 is in threaded connection with one end of the S-type column tension sensor 13, and the adjusting ring 12 is installed therebetween; the other end of the S-type column tension sensor 13 is in threaded connection with one end of the long threaded part 14; the second linear bearing 7-2 is fixed into the second support plate 8-2; the other end of the long threaded part 14 penetrates through the second linear bearing 7-2 and is in hinge joint with the rotatable head 15 through the third Φ8.5 pin 9-3; the rotatable head 15 is placed in a U-type groove of the tension plate 16; the motion of the rotatable head 15 in the U-type groove of the tension plate 16 is limited through the limit plate 17; the tension plate 16 is sleeved on a middle shaft of the thickness specimen 20;

the torque load transmission part comprises a torsion arm 22, a reducer bracket 28, a slider and guideway assembly 29, a bearing sleeve 30, an eccentric coupling 31 for torque, a reducer 32 and a servo motor 33; the reducer bracket 28 is fixed to the base 35, and the servo motor 33 is externally connected with the reducer 32 and is fixed to the reducer bracket 28 jointly with the reducer 32; the output shaft of the reducer 32 is connected with the eccentric coupling 31 for torque; the eccentric coupling 31 for torque is fixed together with the upper end surface of the bearing sleeve 30; the lower end surface of the bearing sleeve 30 is fixed to a sliding block of the slider and guideway assembly 29; a guide rail of the slider and guideway assembly 29 is fixed to the torsion arm 22; and one end of the torsion arm 22 provided with an inner hexagonal head is sleeved above the tension plate 16 on an outer hexagonal head of the thick specimen 20.

The present invention has the beneficial effects: the present invention can isolate three compound loads from each other without interference, and display the applied loads in real time.

DESCRIPTION OF DRAWINGS

The sole FIGURE is a trimetric drawing of a testbed.

In the sole FIGURE: 1 eccentric coupling; 2 camshaft; 3 end cap; 4 cam connecting rod; 5 hinge pin;

6 U-type connecting rod; 7-1 first linear bearing; 7-2 second linear bearing; 8-1 first support plate;

8-2 second support plate; 9-1 first Φ8.5 pin; 9-2 second Φ8.5 pin;

9-3 third Φ8.5 pin; 10 elastic rod; 11 short threaded part; 12 adjusting ring;

13 S-type column tension sensor; 14 long threaded part; 15 rotatable head; 16 tension plate; 17 limit plate;

8 bottom clamping plate; 19 thin specimen; 20 thick specimen; 21 specimen bolt; 22 torsion arm; 23 bearing cap; 24 thrust ball bearing; 25 top clamping plate; 26 axial load bracket; 27 hydraulic puller;

28 reducer bracket; 29 slider and guideway assembly; 30 bearing sleeve; 31 eccentric coupling for torque;

32 reducer; 33 servo motor; 34 three-phase asynchronous motor; 35 base.

DETAILED DESCRIPTION

Specific embodiment of the present invention is further described below in combination with accompanying drawings and the technical solution.

As shown in the sole FIGURE:

A multi-bolt loosening test machine for flange with tension, bending and torsion compound loading consists of three parts: an axial load transmission part, a transverse load transmission part and a torque load transmission part.

The axial load transmission part comprises a bottom clamping plate 18, a thin specimen 19, a thick specimen 20, a specimen bolt 21, a bearing cap 23, a thrust ball bearing 24, a top clamping plate 25, an axial load bracket 26 and a hydraulic puller 27; the bottom clamping plate 18 and the axial load bracket 26 are fixed to a base 35; seam allowances of the thin specimen 19 and the thick specimen 20 are correspondingly assembled together, and assembled and fixed in corresponding bolt holes through the specimen bolt 21; the thin specimen 19 and the thick specimen 20 are integrally installed between the bottom clamping plate 18 and the top clamping plate 25; an outer hexagonal head of the thin specimen 19 is installed in an inner hexagonal head of the bottom clamping plate 18 and is fixed with an inner hexagonal head bolt; the end of the thick specimen 20 is installed in an inner ring of the top clamping plate 25 and is fixed with an inner hexagonal head bolt; the bearing cap 23 penetrates through the top clamping plate 25, and clamps the thrust ball bearing 24 between the bearing cap 23 and the top clamping plate 25; and one end of a hydraulic pushing pole of the hydraulic puller 27 is placed in a cylinder on the axial load bracket 26, and a hook on the hydraulic pushing pole grapples the edge of the bearing cap 23.

The transverse load transmission part comprises an eccentric coupling 1, a camshaft 2, an end cap 3, a cam connecting rod 4, a hinge pin 5, a U-type connecting rod 6, a first linear bearing 7-1, a second linear bearing 7-2, a first support plate 8-1, a second support plate 8-2, a first Φ8.5 pin 9-1, a second Φ8.5 pin 9-2, a third Φ8.5 pin 9-3, an elastic rod 10, a short threaded part 11, an adjusting ring 12, an S-type column tension sensor 13, a long threaded part 14, a rotatable head 15, a tension plate 16, a limit plate 17 and a three-phase asynchronous motor 34; the first support plate 8-1, the second support plate 8-2 and the three-phase asynchronous motor 34 are fixed to the base 35; one end of the eccentric coupling 1 is fixed to a motor shaft of the three-phase asynchronous motor 34, and the other end is fixed together with the camshaft 2; the camshaft 2 is connected together with the cam connecting rod 4 through a ball bearing, and is sealed with the end cap 3 for dust prevention; the cam connecting rod 4 is connected with the U-type connecting rod 6 through the hinge pin 5; the first linear bearing 7-1 is fixed into the first support plate 8-1, and the U-type connecting rod 6 penetrates through the first linear bearing 7-1; one end of the elastic rod 10 is in hinge joint with the U-type connecting rod 6 through the first Φ8.5 pin 9-1, and the other end is in hinge joint with one end of the short threaded part 11 through the second Φ8.5 pin 9-2; the other end of the short threaded part 11 is in threaded connection with one end of the S-type column tension sensor 13, and the adjusting ring 12 is installed therebetween; the other end of the S-type column tension sensor 13 is in threaded connection with one end of the long threaded part 14; the second linear bearing 7-2 is fixed into the second support plate 8-2; the other end of the long threaded part 14 penetrates through the second linear bearing 7-2 and is in hinge joint with the rotatable head 15 through the third Φ8.5 pin 9-3; the rotatable head 15 is placed in a U-type groove of the tension plate 16; the motion of the rotatable head 15 in the U-type groove of the tension plate 16 is limited through the limit plate 17; the tension plate 16 is sleeved on a middle shaft of the thickness specimen 20;

the torque load transmission part comprises a torsion arm 22, a reducer bracket 28, a slider and guideway assembly 29, a bearing sleeve 30, an eccentric coupling 31 for torque, a reducer 32 and a servo motor 33; the reducer bracket 28 is fixed to the base 35, and the servo motor 33 is externally connected with the reducer 32 and is fixed to the reducer bracket 28 jointly with the reducer 32; the output shaft of the reducer 32 is connected with the eccentric coupling 31 for torque; the eccentric coupling 31 for torque is fixed together with the upper end surface of the bearing sleeve 30; the lower end surface of the bearing sleeve 30 is fixed to a sliding block of the slider and guideway assembly 29; a guide rail of the slider and guideway assembly 29 is fixed to the torsion arm 22; and one end of the torsion arm 22 provided with an inner hexagonal head is sleeved above the tension plate 16 on an outer hexagonal head of the thick specimen 20.

A test method of the multi-bolt loosening test machine for flange with tension, bending and torsion compound loading comprises the following steps:

(1) Pressurizing the hydraulic puller 27 to extend the hydraulic pushing pole of the hydraulic puller 27, driving the hook of the hydraulic puller 27 to move upwards, withstanding the axial load bracket 26 by the hydraulic pushing pole and grappling the edge of the bearing cap 23 by the hook, thereby generating an axial tension force.

(2) Starting the three-phase asynchronous motor 34, wherein the motor can rotate to output periodical transverse loads due to the existence of the eccentricity of the eccentric coupling 1, and the motor will not be stuck due to the existence of the elastic rod 10.

(3) Starting the servo motor 33, and swinging the torsion arm due to the existence of the eccentricity of the eccentric coupling 31 for torque, thereby applying circulating torque loads to the thick specimen.

The invention claimed is:

1. A multi-bolt loosening test machine for flange with tension, bending and torsion compound loading, the multi-bolt loosening test machine for flange with tension, bending and torsion compound loading consisting of three parts: an axial load transmission part, a transverse load transmission part and a torque load transmission part, wherein the axial load transmission part comprises a bottom clamping plate (18), a thin specimen (19), a thick specimen (20), a specimen bolt (21), a bearing cap (23), a thrust ball bearing (24), a top clamping plate (25), an axial load bracket (26) and a hydraulic puller (27); the bottom clamping plate (18) and the axial load bracket (26) are fixed to a base (35); seam allowances of the thin specimen (19) and the thick specimen (20) are correspondingly assembled together, and assembled and fixed in corresponding bolt holes through the specimen bolt (21); the thin specimen (19) and the thick specimen (20) are integrally installed between the bottom clamping plate (18) and the top clamping plate (25); an outer hexagonal head of the thin specimen (19) is installed in an inner hexagonal head of the bottom clamping plate (18) and is fixed with an inner hexagonal head bolt; the end of the thick specimen (20) is installed in an inner ring of the top clamping plate (25) and is fixed with an inner hexagonal head bolt; the bearing cap (23) penetrates through the top clamping plate (25), and clamps the thrust ball bearing (24) between the bearing cap (23) and the top clamping plate (25); and one end of a hydraulic pushing pole of the hydraulic puller (27) is placed in a cylinder on the axial load bracket (26), and a hook on the hydraulic pushing pole grapples the edge of the bearing cap (23);

the transverse load transmission part comprises an eccentric coupling (1), a camshaft (2), an end cap (3), a cam connecting rod (4), a hinge pin (5), a U-type connecting rod (6), a first linear bearing (7-1), a second linear bearing (7-2), a first support plate (8-1), a second support plate (8-2), a first Φ8.5 pin (9-1), a second Φ8.5 pin (9-2), a third Φ8.5 pin (9-3), an elastic rod (10), a short threaded part (11), an adjusting ring (12), an S-type column tension sensor (13), a long threaded part (14), a rotatable head (15), a tension plate (16), a limit plate (17) and a three-phase asynchronous motor (34); the first support plate (8-1), the second support plate (8-2) and the three-phase asynchronous motor (34) are fixed to the base (35); one end of the eccentric coupling (1) is fixed to a motor shaft of the three-phase asynchronous motor (34), and the other end is fixed together with the camshaft (2); the camshaft (2) is connected together with the cam connecting rod (4) through a ball bearing, and is sealed with the end cap (3) for dust prevention; the cam connecting rod (4) is connected with the U-type connecting rod (6) through the hinge pin (5); the first linear bearing (7-1) is fixed into the first support plate (8-1), and the U-type connecting rod (6) penetrates through the first linear bearing (7-1); one end of the elastic rod (10) is in hinge joint with the U-type connecting rod (6) through the first Φ8.5 pin (9-1), and the other end is in hinge joint with one end of the short threaded part (11) through the second Φ8.5 pin (9-2); the other end of the short threaded part (11) is in threaded connection with one end of the S-type column tension sensor (13), and the adjusting ring (12) is installed therebetween; the other end of the S-type column tension sensor (13) is in threaded connection with one end of the long threaded part (14); the second linear bearing (7-2) is fixed into the second support plate (8-2); the other end of the long threaded part (14) penetrates through the second linear bearing (7-2) and is in hinge joint with the rotatable head (15) through the third Φ8.5 pin (9-3); the rotatable head (15) is placed in a U-type groove of the tension plate (16); the motion of the rotatable head (15) in the U-type groove of the tension plate (16) is limited through the limit plate (17); the tension plate (16) is sleeved on a middle shaft of the thickness specimen (20); the torque load transmission part comprises a torsion arm (22), a reducer bracket (28), a slider and guideway assembly (29), a bearing sleeve (30), an eccentric coupling (31) for torque, a reducer (32) and a servo motor (33);

the reducer bracket (28) is fixed to the base (35), and the servo motor (33) is externally connected with the reducer (32) and is fixed to the reducer bracket (28) jointly with the reducer (32); the output shaft of the reducer (32) is connected with the eccentric coupling (31) for torque; the eccentric coupling (31) for torque is fixed together with the upper end surface of the bearing sleeve (30); the lower end surface of the bearing sleeve (30) is fixed to a sliding block of the slider and guideway assembly (29); a guide rail of the slider and guideway assembly (29) is fixed to the torsion arm (22); and one end of the torsion arm (22) provided with an inner hexagonal head is sleeved above the tension plate (16) on an outer hexagonal head of the thick specimen (20).

2. The multi-bolt loosening test machine for flange with tension, bending and torsion compound loading according to claim 1, wherein the thickness of the adjusting ring (12) is adjusted according to needs.

* * * * *